(12) United States Patent
Muneda et al.

(10) Patent No.: US 10,794,478 B2
(45) Date of Patent: Oct. 6, 2020

(54) STARTING DEVICE AND MANUFACTURING METHOD OF THE SAME

(71) Applicants: AISIN AW INDUSTRIES CO., LTD, Echizen-shi, Fukui (JP); AISIN AW CO., LTD., Anjo-shi, Aichi (JP)

(72) Inventors: Kenichi Muneda, Echizen (JP); Takao Shimada, Echizen (JP); Fumimasa Kasashima, Echizen (JP); Keigo Goto, Echizen (JP); Masaaki Yamaguchi, Echizen (JP); Kazuyoshi Ito, Anjo (JP); Kensuke Sakamoto, Anjo (JP); Takayuki Miyaoka, Anjo (JP)

(73) Assignees: AISIN AW INDUSTRIES CO., LTD, Echizen (JP); AISIN AW CO., LTD., Anjo (JP)

( * ) Notice: Subject to any disclaimer, the term of this patent is extended or adjusted under 35 U.S.C. 154(b) by 62 days.

(21) Appl. No.: 16/323,056

(22) PCT Filed: Jun. 27, 2017

(86) PCT No.: PCT/JP2017/023499
§ 371 (c)(1),
(2) Date: Feb. 4, 2019

(87) PCT Pub. No.: WO2018/042845
PCT Pub. Date: Mar. 8, 2018

(65) Prior Publication Data
US 2019/0186630 A1    Jun. 20, 2019

(30) Foreign Application Priority Data

Aug. 31, 2016  (JP) .................................. 2016-169679

(51) Int. Cl.
*F16H 61/14*   (2006.01)
*F16H 45/02*   (2006.01)

(52) U.S. Cl.
CPC ............. *F16H 61/14* (2013.01); *F16H 45/02* (2013.01); *F16H 2045/0221* (2013.01); *F16H 2045/0294* (2013.01)

(58) Field of Classification Search
None
See application file for complete search history.

(56) References Cited

U.S. PATENT DOCUMENTS 3,275,108 A * 9/1966 General .................. F16H 61/14
                                                    192/3.3
3,734,251 A * 5/1973 Annis ..................... F16H 61/14
                                                    192/3.3
(Continued)

FOREIGN PATENT DOCUMENTS

JP    2000-088079 A    3/2000
JP    2003-065421 A    3/2003
(Continued)

OTHER PUBLICATIONS

Sep. 5, 2017 International Search Report issued in International Patent Application No. PCT/JP2017/023499.

*Primary Examiner* — Colby M Hansen
(74) *Attorney, Agent, or Firm* — Oliff PLC

(57) ABSTRACT

A washer having such a thickness t that a value (L3−(L1+L2+t)) obtained by subtracting the sum of a first distance L1 in an axial direction between a leading end face of a friction member and a face of a lockup piston, a second distance L2 in the axial direction between a shell-side abutting face of a pump shell and a face of an outside extended portion of an output hub, and the thickness t in the axial direction of the washer, from a third distance L3 in the axial direction between an opposed face of a front cover and a cover-side abutting face of a tubular portion, is in a predetermined (Continued)

range larger than zero, is selected and placed between the lockup piston and the outside extended portion of the output hub.

20 Claims, 7 Drawing Sheets

(56) References Cited

U.S. PATENT DOCUMENTS

| | | | | | |
|---|---|---|---|---|---|
| 4,512,449 | A | * | 4/1985 | Motomura | F16H 45/02 192/3.28 |
| 4,694,941 | A | * | 9/1987 | Hall | F16H 45/02 192/3.28 |
| 5,829,561 | A | * | 11/1998 | Arhab | F16H 41/28 192/3.28 |
| 6,024,195 | A | * | 2/2000 | Hinkel | F16H 45/02 192/3.28 |
| 6,179,106 | B1 | * | 1/2001 | Masuda | F16H 45/02 192/212 |
| 6,258,001 | B1 | * | 7/2001 | Wakuta | B60K 6/36 475/5 |
| 2003/0042098 | A1 | | 3/2003 | Takeuchi et al. | |
| 2004/0251104 | A1 | | 12/2004 | Abe et al. | |

FOREIGN PATENT DOCUMENTS

| | | |
|---|---|---|
| JP | 2004-257537 A | 9/2004 |
| JP | 2004-278717 A | 10/2004 |
| JP | 2014-047811 A | 3/2014 |

* cited by examiner

STARTING DEVICE AND MANUFACTURING METHOD OF THE SAME

This is a national phase application of PCT/JP2017/023499 filed on Jun. 27, 2017, claiming priority to Japanese Patent Application No. JP2016-169679 filed on Aug. 31, 2016, the contents of which are incorporated herein by reference.

TECHNICAL FIELD

The present disclosure relates to a starting device and manufacturing method of the same.

BACKGROUND

A proposed configuration of a starting device includes a front cover coupled with an engine; a pump impeller provided to rotate integrally with the front cover; a turbine runner placed to be opposed to the pump impeller and coupled with an output hub; a damper configured to damp vibration between the front cover and the output hub; and a lockup clutch configured to enforce and release lockup that couples the front cover with the output hub via the damper (as described in, for example, Patent Literature 1). The lockup clutch is configured as a single plate-type hydraulic clutch including a lockup piston that is supported by the output hub to be movable in an axial direction of the starting device; and a friction member attached to a front cover-side face on an outer circumferential portion of the lockup piston. This starting device is provided with a shim placed between the lockup piston and the output hub to adjust an initial position of the lockup piston (i.e., a clearance between the friction member and the front cover) and thereby improve the response of the lockup by the lockup clutch.

CITED REFERENCE

Patent Literature

PTL 1: JP 2014-47811A

SUMMARY

In the starting device described above, however, providing the shim placed between the lockup piston and the output hub is likely to fail in sufficiently suppressing a variation in stroke amount of the lockup piston due to the dimensions and the tolerances of the respective components of the starting device. The large stroke amount of the lockup piston is likely to cause the poor response of the lockup. In the starting device described above, in the state that no hydraulic pressure is supplied, the friction member comes into contact with the front cover, so that the shim is pressed. When the engine is started in this state, power is input into the lockup clutch to drag and rotate the shim and the output hub. This is likely to cause wear of the shim and the output hub.

With regard to a starting device equipped with a single plate-type lockup clutch and a manufacturing method of the same, a main object of the present disclosure is to suppress a variation in stroke amount of a lockup piston and thereby further improve the response of lockup, and to suppress wear of a spacer (shim) and an output member at a start of an engine.

In order to achieve the above primary aim, starting device and manufacturing method of the same of the present disclosure employs the following configuration.

The present disclosure is directed to a starting device and manufacturing method of the same. The first starting device according to the above aspect of the present disclosure includes a front cover coupled with an engine and arranged such that a torque is transmitted from the engine, a hydraulic power transmission comprising a pump impeller having a pump shell that is fixed to the front cover, a turbine runner placed to be opposed to the pump impeller and coupled with one of rotational elements and a shell-side abutting face of the pump shell that abuts on a cover-side abutting face of the front cover in an axial direction of the starting device; a damper configured to damp vibration between the front cover and an output member; and a lockup clutch configured to enforce and release lockup that couples the front cover with the output member. The lockup clutch is a single plate-type clutch including a lockup piston that is supported by the output member to be movable in the axial direction; and a friction member fixed to a front cover-side face of the lockup piston. The starting device further includes a spacer placed at a predetermined position such that a distance between the friction member and an opposed face of the front cover which is opposed to the friction member is in a predetermined range larger than zero. The spacer has such a thickness in the axial direction that a value obtained by subtracting a sum of a first distance in the axial direction between a leading end face of the friction member and a face of the lockup piston opposed to the spacer, a second distance in the axial direction between the shell-side abutting face and a face of the output member opposed to the spacer, and the thickness in the axial direction of the spacer, from a third distance in the axial direction between the opposed face of the front cover and the cover-side abutting face, is within the predetermined range.

The first starting device according to the above aspect of the present disclosure includes the spacer placed at the predetermined position such that the distance between the friction member fixed to the lockup piston of the lockup clutch and the opposed face of the front cover that is opposed to the friction member is in the predetermined range larger than zero. The thickness in the axial direction of the spacer is determined such that the value obtained by subtracting the sum of the first distance in the axial direction between the leading end face of the friction member and the face of the lockup piston opposed to the spacer, the second distance in the axial direction between the shell-side abutting face of the pump shell and the face of the output member opposed to the spacer, and the thickness in the axial direction of the spacer, from the third distance in the axial direction between the opposed face of the front cover and the cover-side abutting face of the front cover, is in the predetermined range. This configuration enables the spacer of the more appropriate thickness to be placed at the predetermined position and thereby more effectively suppresses a variation in distance between the friction member and the opposed face of the front cover and a variation in stroke amount of the lockup piston. As a result, this further improves the response of the lockup. The starting device of this aspect uses the spacer having such a thickness that the value obtained by subtracting the sum of the first distance, the second distance and the thickness of the spacer from the third distance is in the predetermined range larger than zero. In the state that no hydraulic pressure is supplied, the friction member does not come into contact with the front cover. In other words, the lockup is not enforced. This configuration suppresses the spacer and the output member from being dragged and rotating at a start of the engine and thereby suppresses wear of the spacer and the output member.

The second starting device according to the above aspect of the present disclosure includes a front cover coupled with an engine and arranged such that a torque is transmitted from the engine, a hydraulic power transmission comprising a pump impeller having a pump shell that is fixed to the front cover, a turbine runner placed to be opposed to the pump impeller and coupled with one of rotational elements and a shell-side abutting face of the pump shell that abuts on a cover-side abutting face of the front cover in an axial direction of the starting device, a damper configured to damp vibration between the front cover and an output member and a lockup clutch configured to enforce and release lockup that couples the front cover with the output member. The lockup clutch is a single plate-type clutch including a lockup piston that is supported by the output member to be movable in the axial direction and a friction member fixed to a front cover-side face of the lockup piston. The starting device further includes a spacer placed at a predetermined position such that a distance between the friction member and an opposed face of the front cover which is opposed to the friction member is in a predetermined range larger than zero. The spacer has such a thickness in the axial direction that a value obtained by subtracting a sum of a first distance in the axial direction between a leading end face of the friction member and a face of the lockup piston opposed to the spacer and the thickness in the axial direction of the spacer, from a sum of a second distance in the axial direction between the shell-side abutting face and a face of the output member opposed to the spacer and a third distance in the axial direction between the opposed face of the front cover and the cover-side abutting face, is in the predetermined range.

The second starting device according to the above aspect of the present disclosure includes the spacer placed at the predetermined position such that the distance between the friction member fixed to the lockup piston of the lockup clutch and the opposed face of the front cover that is opposed to the friction member is in the predetermined range larger than zero. The thickness in the axial direction of the spacer is determined such that the value obtained by subtracting the first distance in the axial direction between the leading end face of the friction member and the face of the lockup piston opposed to the spacer and the thickness in the axial direction of the spacer, from the sum of the second distance in the axial direction between the shell-side abutting face of the pump shell and the face of the output member opposed to the spacer and the third distance in the axial direction between the opposed face of the front cover and the cover-side abutting face of the front cover, is in the predetermined range. This configuration enables the spacer of the more appropriate thickness to be placed at the predetermined position and thereby more effectively suppresses a variation in distance between the friction member and the opposed face of the front cover and a variation in stroke amount of the lockup piston. As a result, this further improves the response of the lockup. The starting device of this aspect uses the spacer having such a thickness that the value obtained by subtracting the sum of the first distance and the thickness of the spacer from the sum of the second distance and the third distance is in the predetermined range larger than zero. In the state that no hydraulic pressure is supplied, the friction member does not come into contact with the front cover. In other words, the lockup is not enforced. This configuration suppresses the spacer and the output member from being dragged and rotating at a start of the engine and thereby suppresses wear of the spacer and the output member.

The manufacturing method of the first starting device according to the above aspect of the present disclosure includes the starting device comprising a front cover coupled with an engine and arranged such that a torque is transmitted from the engine, a hydraulic power transmission comprising a pump impeller having a pump shell that is fixed to the front cover, a turbine runner placed to be opposed to the pump impeller and coupled with one of rotational elements and a shell-side abutting face of the pump shell that abuts on a cover-side abutting face of the front cover in an axial direction of the starting device, a damper configured to damp vibration between the front cover and an output member and a lockup clutch configured to enforce and release lockup that couples the front cover with the output member. The lockup clutch is a single plate-type clutch including a lockup piston that is supported by the output member to be movable in the axial direction and a friction member fixed to a front cover-side face of the lockup piston. The manufacturing method includes (a) a process of placing a spacer at a predetermined position such that a distance between the friction member and an opposed face of the front cover which is opposed to the friction member is in a predetermined range larger than zero, (b) a process of integrating the front cover with the pump shell and (c) a process of measuring a first distance in the axial direction between a leading end face of the friction member and a face of the lockup piston opposed to the spacer, a second distance in the axial direction between the shell-side abutting face and a face of the output member opposed to the spacer, and a third distance in the axial direction between the opposed face of the front cover and the cover-side abutting face, prior to the process (a). The process (a) includes selecting a spacer having such a thickness that a value obtained by subtracting a sum of the first distance, the second distance and the thickness in the axial direction of the spacer from the third distance is in the predetermined range, among a plurality of different spacers having different thicknesses and placing the selected spacer at the predetermined position.

The manufacturing method of the first starting device according to the above aspect of the present disclosure measures the first distance in the axial direction between the leading end face of the friction member and the face of the lockup piston opposed to the spacer, the second distance in the axial direction between the shell-side abutting face of the pump shell and the face of the output member opposed to the spacer, and the third distance in the axial direction between the opposed face of the front cover and the cover-side abutting face of the front cover. The manufacturing method subsequently selects the spacer having such a thickness that the value obtained by subtracting the sum of the first distance, the second distance and the thickness in the axial direction of the spacer from the third distance is in the predetermined range larger than zero, among the plurality of different spacers having different thicknesses, and places the selected spacer at the predetermined position. This configuration enables the spacer having the more appropriate thickness to be placed at the predetermined position and thereby more effectively suppresses a variation in distance between the friction member and the opposed face of the front cover and a variation in stroke amount of the lockup piston. As a result, this further improves the response of the lockup. The manufacturing method of the starting device of this aspect uses the spacer having such a thickness that the value obtained by subtracting the sum of the first distance, the second distance and the thickness of the spacer from the third distance is in the predetermined range larger than zero.

In the state that no hydraulic pressure is supplied, the friction member does not come into contact with the front cover. In other words, the lockup is not enforced. This configuration suppresses the spacer and the output member from being dragged and rotating at a start of the engine and thereby suppresses wear of the spacer and the output member.

The manufacturing method of the second starting device according to the above aspect of the present disclosure includes the starting device comprising a front cover coupled with an engine and arranged such that a torque is transmitted from the engine, a hydraulic power transmission comprising a pump impeller having a pump shell that is fixed to the front cover, a turbine runner placed to be opposed to the pump impeller and coupled with one of rotational elements and a shell-side abutting face of the pump shell that abuts on a cover-side abutting face of the front cover in an axial direction of the starting device, a damper configured to damp vibration between the front cover and an output member and a lockup clutch configured to enforce and release lockup that couples the front cover with the output member. The lockup clutch is a single plate-type clutch including a lockup piston that is supported by the output member to be movable in the axial direction and a friction member fixed to a front cover-side face of the lockup piston. The manufacturing method includes (a) a process of placing a spacer at a predetermined position such that a distance between the friction member and an opposed face of the front cover which is opposed to the friction member is in a predetermined range larger than zero, (b) a process of integrating the front cover with the pump shell and (c) a process of measuring a first distance in the axial direction between a leading end face of the friction member and a face of the lockup piston opposed to the spacer, a second distance in the axial direction between the shell-side abutting face and a face of the output member opposed to the spacer, and a third distance in the axial direction between the opposed face of the front cover and the cover-side abutting face, prior to the process (a). The process (a) includes selecting a spacer having such a thickness that a value obtained by subtracting a sum of the first distance and the thickness in the axial direction of the spacer from the sum of the second distance and the third distance is in the predetermined range, among a plurality of different spacers having different thicknesses and placing the selected spacer at the predetermined position.

The manufacturing method of the second starting device according to the above aspect of the present disclosure measures the first distance in the axial direction between the leading end face of the friction member and the face of the lockup piston opposed to the spacer, the second distance in the axial direction between the shell-side abutting face of the pump shell and the face of the output member opposed to the spacer, and the third distance in the axial direction between the opposed face of the front cover and the cover-side abutting face of the front cover. The manufacturing method subsequently selects the spacer having such a thickness that the value obtained by subtracting the sum of the first distance and the thickness in the axial direction of the spacer from the sum of the second distance and the third distance is in the predetermined range larger than zero, among the plurality of different spacers having different thicknesses, and places the selected spacer at the predetermined position. This configuration enables the spacer having the more appropriate thickness to be placed at the predetermined position and thereby more effectively suppresses a variation in distance between the friction member and the opposed face of the front cover and a variation in stroke amount of the lockup piston. As a result, this further improves the response of the lockup. The manufacturing method of the starting device of this aspect uses the space having such a thickness that the value obtained by subtracting the sum of the first distance and the thickness of the spacer from the sum of the second distance and the third distance is in the predetermined range larger than zero. In the state that no hydraulic pressure is supplied, the friction member does not come into contact with the front cover. In other words, the lockup is not enforced. This configuration suppresses the spacer and the output member from being dragged and rotating at a start of the engine and thereby suppresses wear of the spacer and the output member.

DESCRIPTION OF EMBODIMENTS

The following describes some aspects of the disclosure with reference to embodiments.

Figure 1:
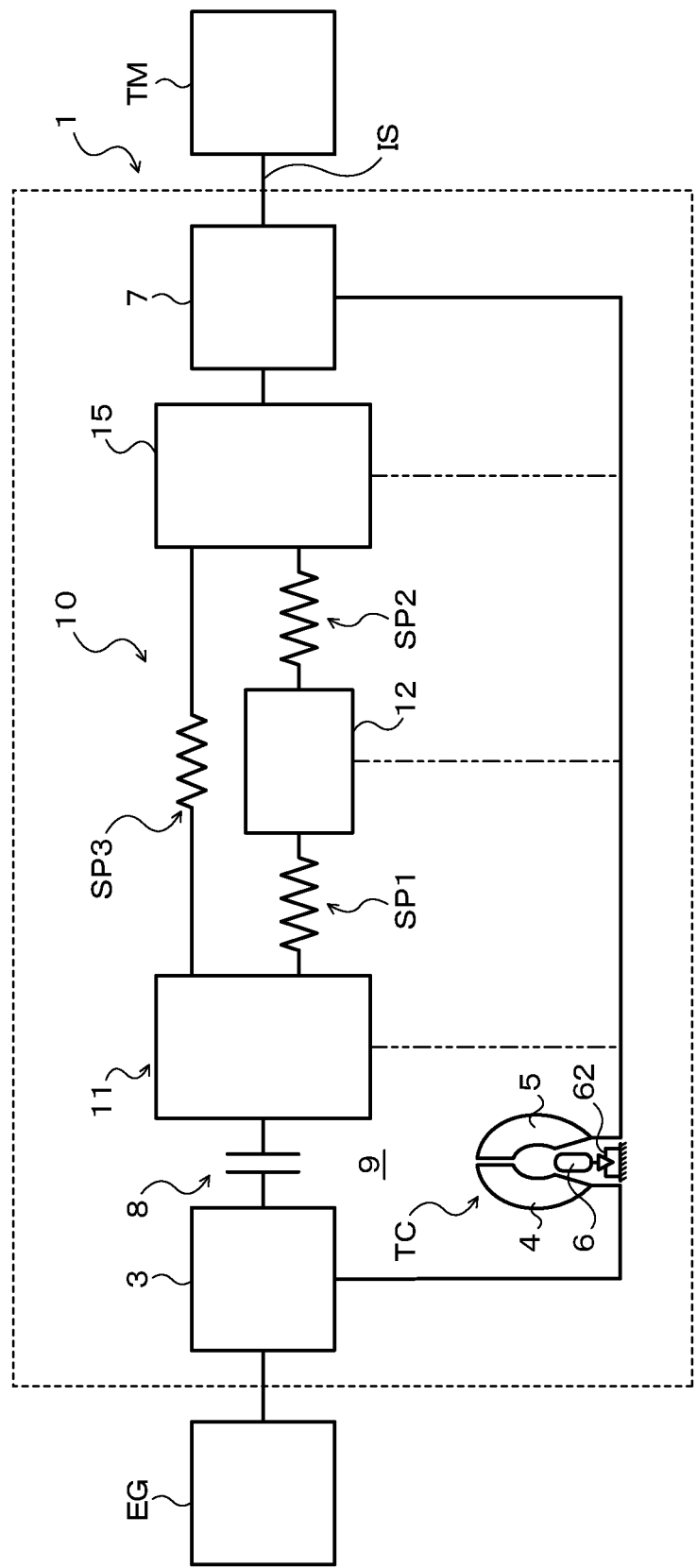
FIG. 1 is a schematic configuration diagram illustrating a starting device 1 according to one embodiment of the present disclosure.
Figure 2:
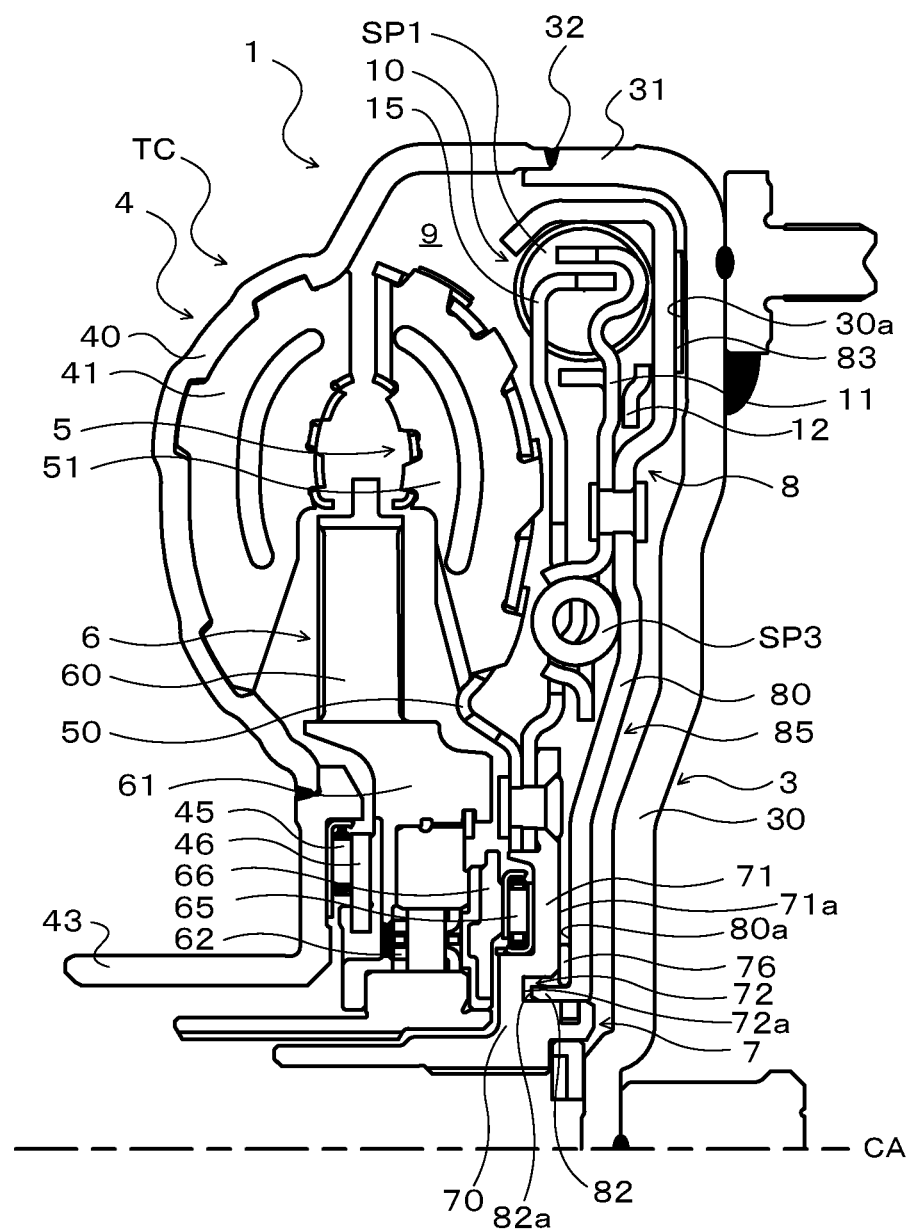
FIG. 2 is a sectional view illustrating the starting device 1.
Figure 3:
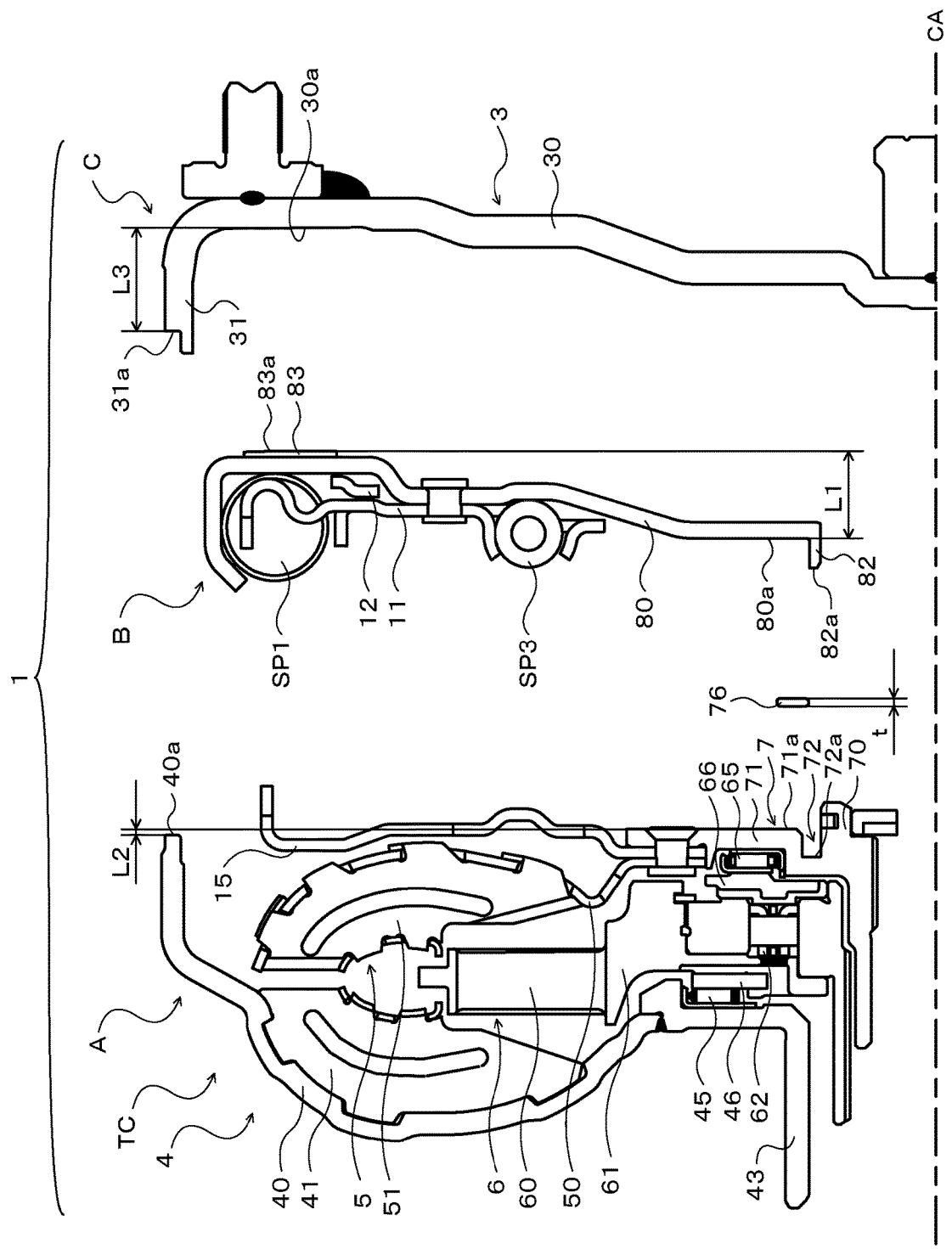
FIG. 3 is an exploded sectional view illustrating the starting device 1.

FIG. 1 is a schematic configuration diagram illustrating a starting device 1 according to one embodiment of the present disclosure. FIG. 2 is a sectional view illustrating the starting device 1. FIG. 3 is an exploded sectional view illustrating the starting device 1. The starting device 1 illustrated in these drawings is mounted on a vehicle equipped with an engine (internal combustion engine) EG as a prime mover. The starting device 1 includes a front cover 3 coupled with a crankshaft of the engine EG; a torque converter (hydraulic power transmission) TC fixed to the front cover 3; an output hub 7 serving as an output member fixed to an input shaft IS of a transmission (power transmission device) TM such as an automatic transmission (AT) or a continuously variable transmission (CVT); a damper 10 configured to damp the vibration between the front cover 3 and the input shaft IS of the transmission TM; and a lockup clutch 8 configured to enforce and release lockup that couples the front cover 3 with the output hub 7 via the damper 10.

In the description below, an "axial direction" basically denotes an extending direction of a center axis CA (axial center as shown in FIG. 2 and FIG. 3) of the starting device 1 or the damper 10, unless otherwise specified. A "radial direction" basically denotes a radial direction of a rotational element of the starting device 1, the damper 10 or the like or more specifically an extending direction of a straight line extended from the center axis CA of the starting device 1 or the damper 10 in a direction perpendicular to the center axis CA (in a radial direction), unless otherwise specified. A "circumferential direction" basically denotes a circumferential direction of the rotational element of the starting device 1, the damper 10 or the like or, in other words, a rotating direction of the rotational element, unless otherwise specified.

As shown in FIG. 2 and FIG. 3, the front cover 3 includes a side face 30 that includes an opposed face 30a arranged to face a friction member 83 attached to a lockup piston 80 of the lockup clutch 8 and that is extended in the radial direction; and a tubular portion 31 that is extended from an outer circumference of the side face 30 toward an opposite side to the engine EG (leftward in FIG. 2) in the axial direction.

The torque converter (hydraulic power transmission) TC includes a pump impeller 4 fixed to the front cover 3; and a turbine runner 5 configured to be rotatable coaxially with the pump impeller 4. The pump impeller 4 includes a pump shell 40 closely fixed to the front cover 3 to define a fluid chamber 9 (shown in FIG. 2) which hydraulic oil flows in; and a plurality of pump blades 41 placed on an inner face of the pump shell 40. According to the embodiment, the front cover 3 and the pump shell 40 are joined (integrated) with each other by laser welding in such a state that a cover-side abutting face 31a of the tubular portion 31 of the front cover 3 (shown in FIG. 3) abuts on a shell-side abutting face 40a of the pump shell 40 (shown in FIG. 3) in the axial direction. Accordingly, the front cover 3 and the pump shell 40 are joined (integrated) with each other via a laser welded spot 32 (shown in FIG. 2). The turbine runner 5 includes a turbine shell 50; and a plurality of turbine blades 51 placed on an inner face of the turbine shell 50. An inner circumferential portion of the turbine shell 50 is fixed to the output hub (output member) 7 by means of a plurality of rivets. The pump impeller 4 and the turbine runner 5 are opposed to each other, and a stator 6 is coaxially arranged between the pump impeller 4 and the turbine runner 5 to rectify the flow of the hydraulic oil (working fluid) from the turbine runner 5 to the pump impeller 4. The stator 6 includes a plurality of stator blades 60; and a blade support 61 provided to support the plurality of stator blades 60. The rotating direction of the stator 6 is set to only one direction by a one-way clutch 62. The pump impeller 4, the turbine runner 5 and the stator 6 form a torus (annular flow path) to circulate the hydraulic oil and serves as a torque converter having a torque amplification function. According to a modification, however, the pump impeller 4 and the turbine runner 5 may serve as fluid coupling with omission of the stator 6 and the one-way clutch 62 of the torque converter TC in the starting device 1.

A coupling member 43 is connected with an inner circumferential side of the pump shell 40. A thrust bearing 45 and a spacer 46 are placed between the coupling member 43 and the blade support 61 of the stator 6 in the axial direction.

The output hub 7 includes a tubular portion 70 in a cylindrical shape; and an outside extended portion 71 that is extended outward in the radial direction from the tubular portion 70 on an opposite side (on the left side in FIG. 2 and FIG. 3) of the front cover 3 across the lockup piston 80. A thrust bearing 65 and a spacer 66 are placed between the outside extended portion 71 and the blade support 61 of the stator 6 in the axial direction. The outside extended portion 71 includes a recessed portion 72a that is recessed in the axial direction from a lockup piston 80-side face 71a.

As shown in FIGS. 1 to 3, the damper 10 includes a drive member (input element) 11 coupled with (fixed to) the lockup piston 80 of the lockup clutch 8 to rotate integrally; an intermediate member (intermediate element) 12; a driven member (output element) 15 coupled with (fixed to) the output hub 7 to rotate integrally; a plurality of first springs SP1 configured to transmit a torque between the drive member 11 and the intermediate member 12; a plurality of second springs SP2 (shown in FIG. 1) configured to transmit a torque between the intermediate member 12 and the driven member 15; and a plurality of third springs SP3 configured to transmit a torque between the drive member 11 and the driven member 15.

According to the embodiment, a linear coil spring, which is formed from a metal material wound in a spiral form such as to have an axial center extended straight when no load is applied, is employed for the first, the second and the third springs SP1, SP2 and SP3 of the damper 10. According to the embodiment, the first springs SP1 and the second springs SP2 have an identical specification (spring constant) and are arranged close to an outer circumference of the damper 10. Furthermore, the third springs SP3 are arranged close to an inner circumference of the damper 10 and operate in parallel with the first springs SP1 and the second springs SP2 when the torque transmitted to the drive member 11 reaches a predetermined torque T1 (first reference value) and a flight angle of the drive member 11 relative to the driven member 15 becomes equal to or greater than a predetermined angle θref. The torque T1 (first reference value) is determined in advance as a torque that is smaller than a torque T2 (second reference value) corresponding to a maximum flight angle θmax of the damper 10. The damper 10 accordingly has two-step (two-stage) damping characteristics.

As shown in FIG. 2 and FIG. 3, the lockup clutch 8 is configured as a single plate-type hydraulic clutch and includes the lockup piston 80 that is placed inside of the front cover 3 and close to an inner wall surface of the front cover 3 on the opposite side to the engine EG (on the left side in FIG. 2) and that is fit in the output hub 7 to be rotatable and to be movable in the axial direction. The friction member 83 is attached to an outer circumferential side- and front cover 3-side-face of the lockup piston 80. Additionally, a lockup chamber 85 (shown in FIG. 2) is defined between the lockup piston 80 and the front cover 3 to be connected with a hydraulic controller (not shown) via a hydraulic oil supply passage and an oil passage formed in the input shaft IS of the transmission TM. In the starting device 1, raising the hydraulic pressure in the fluid chamber 9 to be higher than the hydraulic pressure in the lockup chamber 85 by the hydraulic controller moves the lockup piston 80 toward the opposed face 30a of the front cover 3 and achieves engagement (full engagement or slip engagement) of the lockup clutch 8, thereby enforcing lockup that couples the front cover 3 with the output hub 7 via the damper 10. Raising the hydraulic pressure in the lockup chamber 85 to be higher than the hydraulic pressure in the fluid chamber 9 by the hydraulic controller, on the other hand, moves the lockup piston 80 toward the opposite side to the front cover 3 and releases the lockup clutch 8, thereby releasing the lockup. The lockup piston 80 includes an axial direction extended portion 82 that is extended in the axial direction such as to enter the recessed portion 72 of the outside extended portion 71 of the output hub 7.

A flat plate-like, ring-shaped washer 76 serving as a spacer is placed between the outside extended portion 71 of the output hub 7 and the lockup piston 80 in the axial direction. At a stroke amount of the lockup piston 80 equal to zero (i.e., in the state of FIG. 2), the washer 76 abuts on an outside extended portion 71-side (washer 76-side) face 80a on an inner circumferential portion of the lockup piston 80 as well as on a lockup piston 80-side (washer 76-side) face 71a of the outside extended portion 71 of the output hub 7. In this state, there is a clearance formed between an end face 82a of the axial direction extended portion 82 of the lockup piston 80 and a bottom face 72a of the recessed portion 72 of the outside extended portion 71 of the output hub 7.

According to the embodiment, the washer 76 having such a thickness t that causes a distance between a leading end face 83a of the friction member 83 at the stroke amount of the lockup piston 80 equal to zero and the opposed face 30a of the side face 30 of the front cover 3 (i.e., the stroke amount of the lockup piston 80) to be in a predetermined range larger than zero, is selected among a plurality of different washers 76 having different thicknesses t. The plurality of different washers 76 used here may be washers having the thicknesses t that differ in the unit of several tenths mm. As understood from FIG. 3, the stroke amount of the lockup piston 80 may be calculated as a value (L3−(L1+L2+t)) by subtracting the sum of a first distance L1 in the axial direction between the leading end face (opposed face 30a-side face) 83a of the friction member 83 and the outside extended portion 71-side (washer 76-side) face 80a on the inner circumferential portion of the lockup piston 80, a second distance L2 in the axial direction between the shell-side abutting face 40a of the pump shell 40 and the lockup piston 80-side (washer 76-side) face 71a of the outside extended portion 71 of the output hub 7, and the thickness t in the axial direction of the washer 76, from a third distance L3 in the axial direction between the opposed face 30a of the side face 30 and the cover-side abutting face 31a of the tubular portion 31 of the front cover 3. The washer 76 having such a thickness t that causes the value (L3−(L1+L2+t)) to be in the predetermined range is accordingly selected among the plurality of different washers 76 having the different thicknesses t. As understood from FIG. 2 and FIG. 3, the shell-side abutting face 40a of the pump shell 40 is located on a torque converter TC-side (on the left side in FIG. 3) of the lockup piston 80-side (washer 76-side) face 71a of the outside extended portion 71 of the output hub 7 in the axial direction when the second distance L2 is larger than a value 0. When the shell-side abutting face 40a of the pump shell 40 and the face 71a of the outside extended portion 71 of the output hub 7 are located at an identical position in the axial direction, the second distance L2 is equal to zero. Even in such a case, the above method is thus still employable to select the thickness t of the spacer 76.

In the starting device 1, the value (L3−(L1+L2)) varies due to the dimensions and the tolerances of the respective components. In the case where no washer 76 is used or in the case where a single washer 76 is used, this causes a variation in the distance between the leading end face 83a of the friction member 83 and the opposed face 30a of the front cover 3 and thereby a variation in the stroke amount of the lockup piston 80. The larger stroke amount of the lockup piston 80 is likely to provide the poor lockup response. The embodiment uses the washer 76 having such a thickness t that causes the value (L3−(L1+L2+t)) to be in the predetermined range. This ensures using the more appropriate washer 76 and thereby suppresses a variation in the distance between the leading end face 83a of the friction member 83 and the opposed face 30a of the front cover 3, in other words, a variation in the stroke amount of the lockup piston 80. More specifically, this configuration causes the variation in the stroke amount of the lockup piston 80 to be equal to or less than an interval of the thicknesses t of the plurality of different washers 76 (for example, when the thicknesses t of the plurality of different washers 76 differ in the unit of several tenths mm, the interval is several tenths mm). As a result, this configuration further improves the response of the lockup.

The starting device 1 uses the washer 76 having such a thickness t that causes the value (L3−(L1+L2+t)) to be in the predetermined range larger than zero. In the state that no hydraulic pressure is supplied, the friction member 83 accordingly does not come into contact with the front cover 3 (i.e., the lockup is not enforced). This configuration suppresses the washer 76 and the output hub 7 from being dragged and rotating at a start of the engine EG and thereby suppresses wear of the washer 76 and the output hub 7.

According to the embodiment, the front cover 3 and the pump impeller 4 (pump shell 40) are fixed to each other by laser welding. This configuration completes the welding operation in a shorter time period, compared with a configuration that fixes the front cover 3 and the pump impeller 4 to each other by arc welding. Accordingly, this configuration causes the smaller amount of heat to be input into the front cover 3 and the pump impeller 4 (pump shell 40), compared with the amount of input heat in the configuration that fixes the front cover 3 and the pump impeller 4 to each other by arc welding. This reduces a strain generated in the front cover 3 and the pump impeller 4 (pump shell 40). As a result, this further reduces a variation in the value (L3−(L1+L2+t)) prior to welding due to the strain generated in the front cover 3 and the pump impeller 4 (pump shell 40). By the inventors' experiments and the like, it has been found that laser welding has a smaller variation in the stroke amount of the lockup piston 80 to be approximately half to one sixth of the variation in the stroke amount by arc welding.

Figure 4:
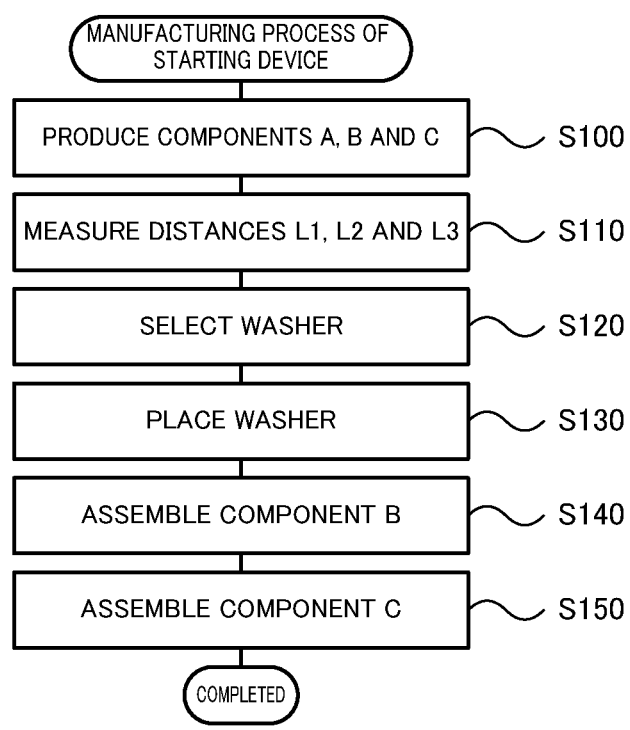
FIG. 4 is a process chart of manufacturing the starting device 1.

The following describes the operations in the process of manufacturing the starting device 1. FIG. 4 is a process chart of manufacturing the starting device 1. The manufacturing process of the starting device 1 first produces three components A, B and C shown in FIG. 3 (process S100). The component A includes, for example, the torque converter TC, the driven member 15 of the damper 10 and the output hub 7 that are produced individually and are then integrated. The component B includes, for example, the lockup piston 80 with the friction member 83 attached thereto and the components other than the driven member 15 of the damper 10 that are produced individually and are then integrated. The component C is the front cover 3.

After producing the components A, B and C, the manufacturing process measures the first distance L1 between the leading end face 83a of the friction member 83 and the face 80a of the lockup piston 80 in the component B, the second distance L2 between the shell-side abutting face 40a of the pump shell 40 and the face 71a of the outside extended portion 71 of the output hub 7 in the component A, and the third distance L3 between the opposed face 30a and the cover-side abutting face 31a of the front cover 3 in the component C (process S110). The manufacturing process subsequently selects the washer 76 having such a thickness t that causes the value (L3−(L1+L2+t)) to be in the predetermined range among the plurality of different washers 76 having the different thicknesses t (process S120).

The manufacturing process then places the selected washer 76 to abut on the face 71a of the outside extended portion 71 of the output hub 7 in the component A (process S130) and further places the component B relative to the component A such that the damper 10 comes into contact with the washer 76 (process S140). The processes S130 and S140 cause the washer 76 to abut on the face 71a of the outside extended portion 71 of the output hub 7 as well as on the face 80a of the lockup piston 80. The manufacturing process then causes the shell-side abutting face 40a of the pump impeller 4 (pump shell 40) to abut on the cover-side abutting face 31a of the front cover 3 and joins them with each other by laser welding, so as to assemble the component C with the component A (process S150). The starting device 1 is completed by this series of processes.

According to the embodiment, the washer 76 having such a thickness t that causes the value (L3−(L1+L2+t)) to be in the predetermined range is selected among the plurality of different washers 76 having the different thicknesses t and is placed between the outside extended portion 71 of the output hub 7 and the lockup piston 80. This ensures using the washer 76 having the more appropriate thickness t and thereby more effectively suppresses a variation in the distance between the leading end face 83a of the friction member 83 and the opposed face 30a of the front cover 3, in other words, a variation in the stroke amount of the lockup piston 80. As a result, this further improves the response of the lockup. Furthermore, the front cover 3 and the pump impeller 4 (pump shell 40) are joined with each other by laser welding. This configuration further reduces the variation in the stroke amount of the lockup piston 80, compared with a configuration that joins the front cover 3 and the pump impeller 4 with each other by arc welding or the like.

Figure 5:
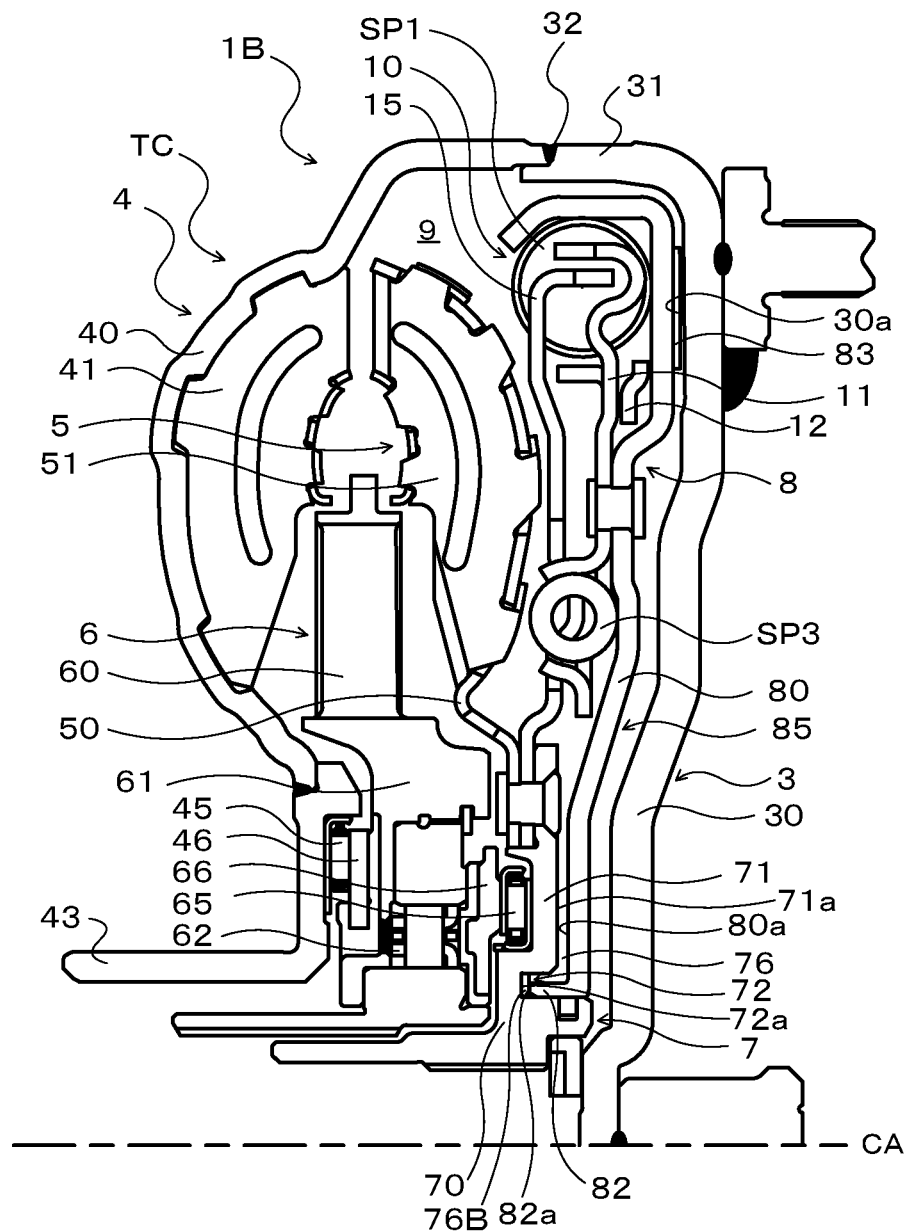
FIG. 5 is a sectional view illustrating a starting device 1B.
Figure 6:
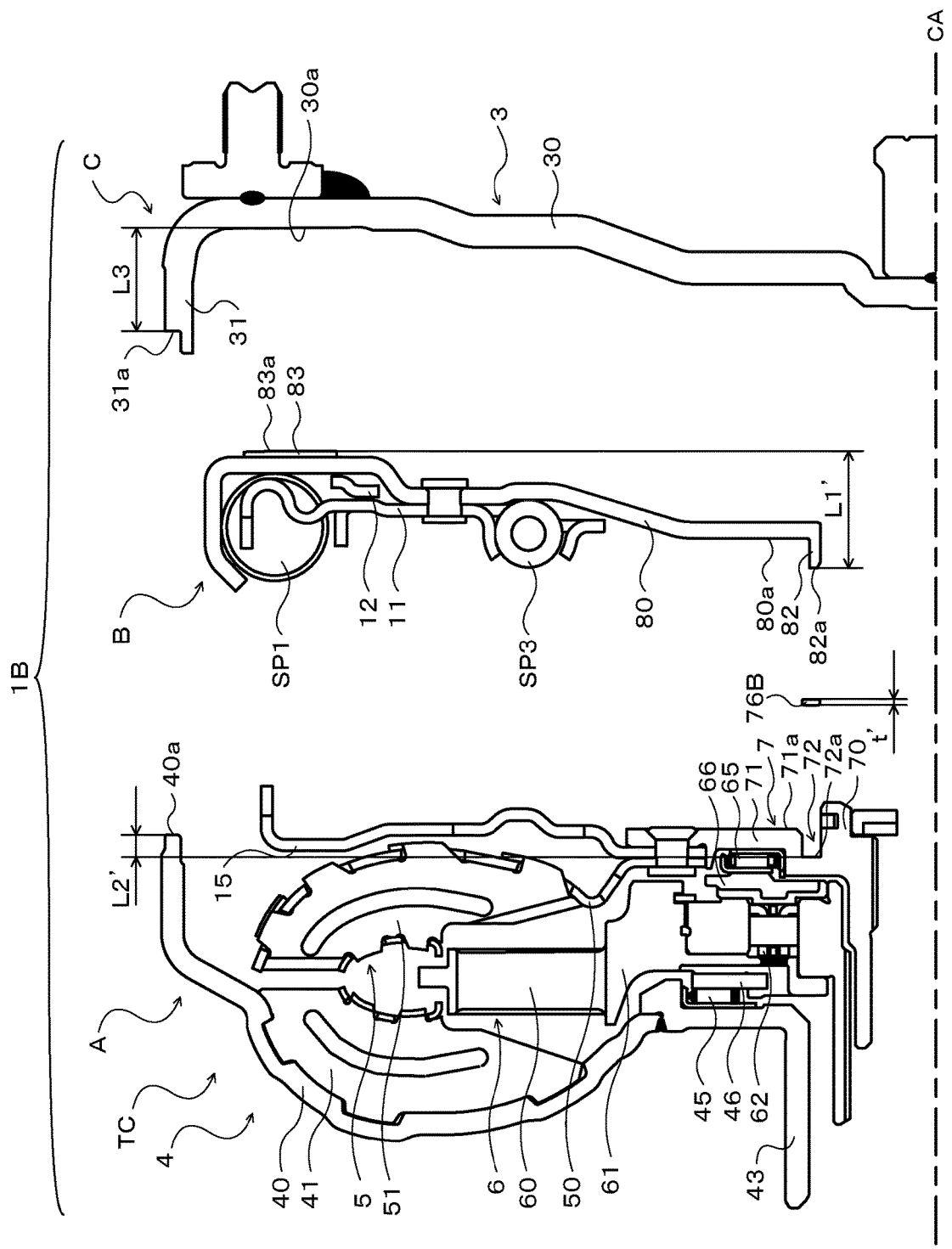
FIG. 6 is an exploded sectional view illustrating the starting device 1B.

In the starting device 1 described above, the washer 76 having such a thickness t that causes the stroke amount of the lockup piston 80 to be in the predetermined range is selected among the plurality of different washers 76 having the different thicknesses t and is placed between the face 71a of the outside extended portion 71 of the output hub 7 and the face 80a of the lockup piston 80. This configuration is, however, not essential. FIG. 5 and FIG. 6 are respectively a sectional view and a partial sectional view illustrating a starting device 1B according to another embodiment. The starting device 1B shown in FIG. 5 and FIG. 6 has a configuration similar to that of the starting device 1 shown in FIGS. 1 to 3, except that a washer 76B is used in place of the washer 76. The like components of the starting device 1B to those of the starting device 1 are expressed by the like reference signs, and their detailed description is omitted.

In the starting device 1B shown in FIG. 5 and FIG. 6, the flat plate-like, ring-shaped washer 76B serving as a spacer is placed inside of the recessed portion 72 of the outside extended portion 71 of the output hub 7 and is arranged between the bottom face 72a of the recessed portion 72 and the end face 82a of the axial direction extended portion 82 of the lockup piston 80 in the axial direction. At the stroke amount of the lockup piston 80 equal to zero (i.e., in the state of FIG. 5), the washer 76B abuts on the end face 82a of the axial direction extended portion 82 of the lockup piston 80 as well as on the bottom face 72a of the recessed portion 72 of the output hub 7. In this state, there is a clearance formed between the face 71a of the outside extended portion 71 of the output hub 7 and the face 80a of the lockup piston 80.

In the starting device 1B, the washer 76B having such a thickness t' that causes a distance between the leading end face 83a of the friction member 83 at the stroke amount of the lockup piston 80 equal to zero and the opposed face 30a of the side face 30 of the front cover 3 (i.e., the stroke amount of the lockup piston 80) to be in a predetermined range larger than zero, is selected among a plurality of different washers 76B having different thicknesses t'. The plurality of different washers 76B used here may be washers having the thicknesses t' that differ in the unit of several tenths mm. As understood from FIG. 6, the stroke amount of the lockup piston 80 may be calculated as a value (L2'+L3−(L1'+t')) by subtracting the sum of a first distance L1' in the axial direction between the leading end face 83a of the friction member 83 and the end face 82a of the axial direction extended portion 82 of the lockup piston 80 and the thickness t' in the axial direction of the washer 76B from the sum of a second distance L2' in the axial direction between the shell-side abutting face 40a of the pump shell 40 and the bottom face 72a of the recessed portion 72 of the output hub 7 and a third distance L3 in the axial direction between the opposed face 30a of the side face 30 and the cover-side abutting face 31a of the tubular portion 31 of the front cover 3. The washer 76B having such a thickness t' that causes the value (L2'+L3−(L1'+t')) to be in the predetermined range is accordingly selected among the plurality of different washers 76B having the different thicknesses t'. As understood from FIG. 5 and FIG. 6, the shell-side abutting face 40a of the pump shell 40 is located on a front cover 3-side (on the right side in FIG. 6) of the bottom face 72a of the recessed portion 72 of the output hub 7 in the axial direction when the second distance L2' is larger than a value 0. When the shell-side abutting face 40a of the pump shell 40 and the bottom face 72a of the recessed portion 72 of the output hub 7 are located at an identical position in the axial direction, the second distance L2' is equal to zero. Even in such a case, the above method is thus still employable to select the thickness t' of the spacer 76.

As described above, the starting device 1B uses the washer 76B having such a thickness t' that causes the value (L2'+L3−(L1'+t')) to be in the predetermined range. This ensures using the more appropriate washer 76B and thereby suppresses a variation in the distance between the leading end face 83a of the friction member 83 and the opposed face 30a of the front cover 3, in other words, a variation in the stroke amount of the lockup piston 80. More specifically, this configuration causes the variation in the stroke amount of the lockup piston 80 to be equal to or less than an interval of the thicknesses t' of the plurality of different washers 76B (for example, when the thicknesses t' of the plurality of different washers 76B differ in the unit of several tenths mm, the interval is several tenths mm). As a result, this configuration further improves the response of the lockup.

The starting device 1B uses the washer 76B having such a thickness t' that causes the value (L2'+L3−(L1'+t')) to be in the predetermined range larger than zero. In the state that no hydraulic pressure is supplied, the friction member 83 accordingly does not come into contact with the front cover 3 (i.e., the lockup is not enforced). This configuration suppresses the washer 76B and the output hub 7 from being dragged and rotating at a start of the engine EG and thereby suppresses wear of the washer 76B and the output hub 7.

Figure 7:
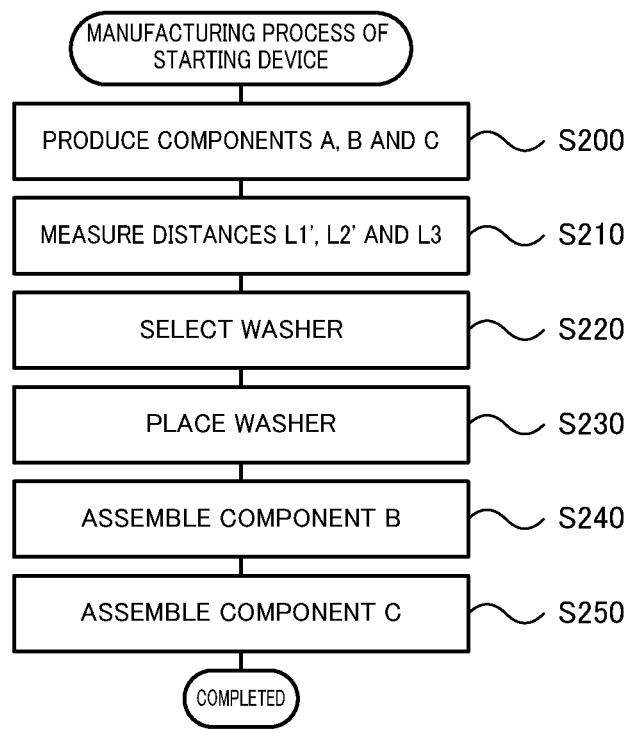
FIG. 7 is a process chart of manufacturing the starting device 1B.

The following describes the operations in the process of manufacturing the starting device 1B. FIG. 7 is a process chart of manufacturing the starting device 1B. The manufacturing process of the starting device 1B first produces three components A, B and C (process S200). The three components A, B and C shown in FIG. 5 are the same as the three components A, B and C shown in FIG. 3. The manufacturing process subsequently measures the first distance L1' between the leading end face 83a of the friction member 83 and the end face 82a of the axial direction extended portion 82 of the lockup piston 80 in the component B, the second distance L2' between the shell-side abutting face 40a of the pump shell 40 and the bottom face 72a of the recessed portion 72 of the output hub 7 in the component A, and the third distance L3 between the opposed face 30a of the side face 30 and the cover-side abutting face 31a of the tubular portion 31 of the front cover 3 in the component C (process S210). The manufacturing process subsequently selects the washer 76B having such a thickness t' that causes the value (L2'+L3−(L1'+t')) to be in the predetermined range among the plurality of different washers 76B having the different thicknesses t' (process S220).

The manufacturing process then places the selected washer 76B to abut on the bottom face 72a of the recessed portion 72 of the output hub 7 in the component A (process P230) and further places the component B relative to the component A such that the damper 10 comes into contact with the washer 76B (process S240). The processes S230 and S240 cause the washer 76B to abut on the bottom face 72a of the recessed portion 72 of the output hub 7 as well as on the end face 82a of the axial direction extended portion 82 of the lockup piston 80. The manufacturing process then causes the shell-side abutting face 40a of the pump impeller 4 (pump shell 40) to abut on the cover-side abutting face 31a of the front cover 3 and joins them with each other by laser welding, so as to assemble the component C with the component A (process S250). The starting device 1B is completed by this series of processes.

In this starting device 1B, the washer 76B having such a thickness t' that causes the value (L2'+L3−(L1'+t')) to be in the predetermined range is selected among the plurality of different washers 76B having the different thicknesses t' and is placed between the bottom face 72a of the recessed portion 72 of the output hub 7 and the end face 82a of the axial direction extended portion 82 of the lockup piston 80. This ensures using the washer 76B having the more appropriate thickness t' and thereby more effectively suppresses a variation in the distance between the leading end face 83a of the friction member 83 and the opposed face 30a of the front cover 3, in other words, a variation in the stroke amount of the lockup piston 80. As a result, this further improves the response of the lockup. Furthermore, in the starting device 1B, as in the starting device 1, the front cover 3 and the pump impeller 4 (pump shell 40) are joined with each other by laser welding. This configuration further reduces the variation in the stroke amount of the lockup piston 80, compared with the configuration that joins the front cover 3 and the pump impeller 4 with each other by arc welding or the like.

In the starting devices 1 and 1B described above, the front cover 3 and the pump impeller 4 (pump shell 40) are integrated with each other via the laser welded spot 32. This configuration is, however, not essential. According to a modification, the front cover 3 and the pump impeller 4 may be integrated with each other via another welded spot such as an arc welded spot.

In the starting devices 1 and 1B described above, the turbine runner 5 is fixed to the output hub 7. This configuration is, however, not essential. According to a modification, the turbine runner 5 may be coupled with any one of the drive member 11, the intermediate member 12 and the driven member 15 as shown by a two-dot chain line in FIG. 1.

As described above, the starting device (1) according to the above aspect of the present disclosure includes a front cover (3) coupled with an engine (EG) and arranged such that a torque is transmitted from the engine (EG), a hydraulic power transmission (TC) comprising a pump impeller (4) having a pump shell (40) that is fixed to the front cover (3), a turbine runner (5) placed to be opposed to the pump impeller (4) and coupled with one of rotational elements and a shell-side abutting face (40a) of the pump shell (40) that abuts on a cover-side abutting face (31a) of the front cover (3) in an axial direction of the starting device (1), a damper (10) configured to damp vibration between the front cover (3) and an output member (7) and a lockup clutch (8) configured to enforce and release lockup that couples the front cover (3) with the output member (7). The lockup clutch (8) is a single plate-type clutch including a lockup piston (80) that is supported by the output member (7) to be movable in the axial direction and a friction member (83) fixed to a front cover (3)-side face of the lockup piston (80). The starting device (1) further includes a spacer (76) placed at a predetermined position such that a distance between the friction member (83) and an opposed face (30a) of the front cover (3) which is opposed to the friction member (83) is in a predetermined range larger than zero. The spacer (76) has such a thickness in the axial direction that a value obtained by subtracting a sum of a first distance in the axial direction between a leading end face (83a) of the friction member (83) and a face (80a) of the lockup piston (80) opposed to the spacer (76), a second distance in the axial direction between the shell-side abutting face (40a) and a face (71a) of the output member (7) opposed to the spacer (76), and the thickness in the axial direction of the spacer (76), from a third distance in the axial direction between the opposed face (30a) of the front cover (3) and the cover-side abutting face (31a), is within the predetermined range.

The first starting device according to the above aspect of the present disclosure includes the spacer placed at the predetermined position such that the distance between the friction member fixed to the lockup piston of the lockup clutch and the opposed face of the front cover that is opposed to the friction member is in the predetermined range larger than zero. The thickness in the axial direction of the spacer is determined such that the value obtained by subtracting the sum of the first distance in the axial direction between the leading end face of the friction member and the face of the lockup piston opposed to the spacer, the second distance in the axial direction between the shell-side abutting face of the pump shell and the face of the output member opposed to the spacer, and the thickness in the axial direction of the spacer, from the third distance in the axial direction between the opposed face of the front cover and the cover-side abutting face of the front cover, is in the predetermined range. This configuration enables the spacer of the more appropriate thickness to be placed at the predetermined position and thereby more effectively suppresses a variation in distance between the friction member and the opposed face of the front cover and a variation in stroke amount of the lockup piston. As a result, this further improves the response of the lockup.

In the first starting device (1) according to the above aspect of the present disclosure, the shell-side abutting face (40a) may be located on a hydraulic power transmission (TC)-side of the output member (7) in the axial direction.

In the first starting device (1) according to the above aspect of the present disclosure, the output member (7) may include an outside extended portion (71) that is extended outward in a radial direction of the starting device (1) on an opposite side to the front cover (3) across the lockup piston (80), and the predetermined position is between the lockup piston (80) and the outside extended portion (71) in the axial direction. In this case, the front cover (3) may include a side face (30) that includes the opposed face (30a) and that is extended in the radial direction; and a tubular portion (31) that is extended in the axial direction from an outer circumference of the side face (30) and that includes the cover-side abutting face (31a). The second distance may be a distance in the axial direction between the shell-side abutting face (40a) and a face of the outside extended portion (71)

opposed to the spacer (76), and the third distance may be a distance in the axial direction between the opposed face (30*a*) of the side face (30) and the cover-side abutting face (31*a*) of the tubular portion (31).

The second starting device (1B) according to the above aspect of the present disclosure includes a front cover (3) coupled with an engine (EG) and arranged such that a torque is transmitted from the engine (EG); a hydraulic power transmission (TC) comprising a pump impeller (4) having a pump shell (40) that is fixed to the front cover (3); a turbine runner (5) placed to be opposed to the pump impeller (4) and coupled with one of rotational elements; and a shell-side abutting face (40*a*) of the pump shell (40) that abuts on a cover-side abutting face (31*a*) of the front cover (3) in an axial direction of the starting device (1); a damper (10) configured to damp vibration between the front cover (3) and an output member (7); and a lockup clutch (8) configured to enforce and release lockup that couples the front cover (3) with the output member (7). The lockup clutch (8) is a single plate-type clutch including a lockup piston (80) that is supported by the output member (7) to be movable in the axial direction; and a friction member (83) fixed to a front cover (3)-side face of the lockup piston (80). The starting device (1) further include a spacer (76B) placed at a predetermined position such that a distance between the friction member (83) and an opposed face (30*a*) of the front cover (3) which is opposed to the friction member (83) is in a predetermined range larger than zero. The spacer (76B) has such a thickness in the axial direction that a value obtained by subtracting a sum of a first distance in the axial direction between a leading end face (83*a*) of the friction member (83) and a face (82*a*) of the lockup piston (80) opposed to the spacer (76B) and the thickness in the axial direction of the spacer (76B), from a sum of a second distance in the axial direction between the shell-side abutting face (40*a*) and a face (72*a*) of the output member (7) opposed to the spacer (76B) and a third distance in the axial direction between the opposed face (30*a*) of the front cover (3) and the cover-side abutting face (31*a*), is in the predetermined range.

The second starting device according to the above aspect of the present disclosure includes the spacer placed at the predetermined position such that the distance between the friction member fixed to the lockup piston of the lockup clutch and the opposed face of the front cover that is opposed to the friction member is in the predetermined range larger than zero. The thickness in the axial direction of the spacer is determined such that the value obtained by subtracting the first distance in the axial direction between the leading end face of the friction member and the face of the lockup piston opposed to the spacer and the thickness in the axial direction of the spacer, from the sum of the second distance in the axial direction between the shell-side abutting face of the pump shell and the face of the output member opposed to the spacer and the third distance in the axial direction between the opposed face of the front cover and the cover-side abutting face of the front cover, is in the predetermined range. This configuration enables the spacer of the more appropriate thickness to be placed at the predetermined position and thereby more effectively suppresses a variation in distance between the friction member and the opposed face of the front cover and a variation in stroke amount of the lockup piston. As a result, this further improves the response of the lockup.

In the second starting device (1B) according to the above aspect of the present disclosure, the shell-side abutting face (40*a*) may be located on a front cover (3)-side of the output member (7) in the axial direction.

In the manufacturing method of the second starting device (1B) according to the above aspect of the present disclosure, the output member (7) may include an outside extended portion (71) that is extended outward in a radial direction of the starting device (1) on an opposite side to the front cover (3) across the lockup piston (80). The outside extended portion (71) may include a recessed portion (72) that is recessed in the axial direction from a lockup piston (80)-side face (71*a*). The lockup piston (80) may include an axial direction extended portion (82) that is extended in the axial direction to enter the recessed portion (72). The predetermined position may be between a bottom face (72*a*) of the recessed portion (72) and an end face (82*a*) of the axial direction extended portion (82) in the axial direction. In this case, the front cover (3) may include a side face (30) that includes the opposed face (30*a*) and that is extended in the radial direction; and a tubular portion (31) that is extended in the axial direction from an outer circumference of the side face (30) and that includes the cover-side abutting face (31*a*). The first distance may be a distance in the axial direction between the leading end face (83*a*) of the friction member (83) and the end face (82*a*) of the axial direction extended portion (82). The second distance may be a distance in the axial direction between the shell-side abutting face (40*a*) and the bottom face (72*a*) of the recessed portion (72). The third distance may be a distance in the axial direction between the opposed face (30*a*) of the side face (30) and the cover-side abutting face (31*a*) of the tubular portion (31).

In the first or second starting device (1, 1B) according to the above aspect of the present disclosure, the damper (10) may be connected with the front cover (3) via the lockup clutch (8) and is connected with the output member (7).

In the first or second starting device (1, 1B) according to the above aspect of the present disclosure, the front cover (3) and the pump shell (40) may be integrated with each other via a laser welded spot. This configuration further reduces the variation in stroke amount of the lockup piston, compared with a configuration of integrating the front cover with the pump shell by an arc welded spot or the like.

The manufacturing method of the first starting device (1) according to the above aspect of the present disclosure includes the starting device (1) comprising a front cover (3) coupled with an engine (EG) and arranged such that a torque is transmitted from the engine (EG), a hydraulic power transmission (TC) comprising a pump impeller (4) having a pump shell (40) that is fixed to the front cover (3), a turbine runner (5) placed to be opposed to the pump impeller (4) and coupled with one of rotational elements and a shell-side abutting face (40*a*) of the pump shell (40) that abuts on a cover-side abutting face (31*a*) of the front cover (3) in an axial direction of the starting device (1), a damper (10) configured to damp vibration between the front cover (3) and an output member (7) and a lockup clutch (8) configured to enforce and release lockup that couples the front cover (3) with the output member (7). The lockup clutch (8) is a single plate-type clutch including a lockup piston (80) that is supported by the output member (7) to be movable in the axial direction and a friction member (83) fixed to a front cover (3)-side face of the lockup piston (80). The manufacturing method further includes (a) a process of placing a spacer (76) at a predetermined position such that a distance between the friction member (83) and an opposed face (30*a*) of the front cover (3) which is opposed to the friction member (83) is in a predetermined range larger than zero, (b) a process of integrating the front cover (3) with the pump shell (40) and (c) a process of measuring a first distance in the axial direction between a leading end face (83a) of the friction member (83) and a face (80a) of the lockup piston (80) opposed to the spacer (76), a second distance in the axial direction between the shell-side abutting face (40a) and a face (71a) of the output member (7) opposed to the spacer (76), and a third distance in the axial direction between the opposed face (30a) of the front cover and the cover-side abutting face (31a), prior to the process (a). The process (a) comprises selecting a spacer (76) having such a thickness that a value obtained by subtracting a sum of the first distance, the second distance and the thickness in the axial direction of the spacer (76) from the third distance is in the predetermined range, among a plurality of different spacers having different thicknesses and placing the selected spacer (76) at the predetermined position.

The manufacturing method of the first starting device according to the above aspect of the present disclosure measures the first distance in the axial direction between the leading end face of the friction member and the face of the lockup piston opposed to the spacer, the second distance in the axial direction between the shell-side abutting face of the pump shell and the face of the output member opposed to the spacer, and the third distance in the axial direction between the opposed face of the front cover and the cover-side abutting face of the front cover. The manufacturing method subsequently selects the spacer having such a thickness that the value obtained by subtracting the sum of the first distance, the second distance and the thickness in the axial direction of the spacer from the third distance is in the predetermined range larger than zero, among the plurality of different spacers having different thicknesses, and places the selected spacer at the predetermined position. This configuration enables the spacer having the more appropriate thickness to be placed at the predetermined position and thereby more effectively suppresses a variation in distance between the friction member and the opposed face of the front cover and a variation in stroke amount of the lockup piston. As a result, this further improves the response of the lockup.

The manufacturing method of the first starting device (1) according to the above aspect of the present disclosure may locate the shell-side abutting face (40a) on a hydraulic power transmission (TC)-side of the output member (7) in the axial direction.

In the manufacturing method of the first starting device (1) according to the above aspect of the present disclosure, the output member (7) may include an outside extended portion (71) that is extended outward in a radial direction of the starting device (1) on an opposite side to the front cover (3) across the lockup piston (80), and the predetermined position may be between the lockup piston (80) and the outside extended portion (71) in the axial direction. In this case, the front cover (3) may include a side face (30) that includes the opposed face (30a) and that is extended in the radial direction; and a tubular portion (31) that is extended in the axial direction from an outer circumference of the side face (30) and that includes the cover-side abutting face (31a). The second distance may be a distance in the axial direction between the shell-side abutting face (40a) and a face (71a) of the outside extended portion (71) opposed to the spacer (76). The third distance may be a distance in the axial direction between the opposed face (30a) of the side face (30) and the cover-side abutting face (31a) of the tubular portion (31).

The manufacturing method of the second starting device (1B) according to the above aspect of the present disclosure includes a front cover (3) coupled with an engine (EG) and arranged such that a torque is transmitted from the engine (EG), a hydraulic power transmission (TC) comprising a pump impeller (4) having a pump shell (40) that is fixed to the front cover (3), a turbine runner (5) placed to be opposed to the pump impeller (4) and coupled with one of rotational elements and a shell-side abutting face (40a) of the pump shell (40) that abuts on a cover-side abutting face (31a) of the front cover (3) in an axial direction of the starting device (1), a damper (10) configured to damp vibration between the front cover (3) and an output member (7) and a lockup clutch (8) configured to enforce and release lockup that couples the front cover (3) with the output member (7). The lockup clutch (8) is a single plate-type clutch including a lockup piston (80) that is supported by the output member (7) to be movable in the axial direction and a friction member (83) fixed to a front cover (3)-side face of the lockup piston (80). The manufacturing method further includes (a) a process of placing a spacer (76B) at a predetermined position such that a distance between the friction member (83) and an opposed face (30a) of the front cover (3) which is opposed to the friction member (83) is in a predetermined range larger than zero, (b) a process of integrating the front cover (3) with the pump shell (40) and (c) a process of measuring a first distance in the axial direction between a leading end face (83a) of the friction member (83) and a face (82a) of the lockup piston (80) opposed to the spacer (76B), a second distance in the axial direction between the shell-side abutting face (40a) and a face (72a) of the output member (7) opposed to the spacer (76B), and a third distance in the axial direction between the opposed face (30a) of the front cover and the cover-side abutting face (31a), prior to the process (a). The process (a) includes selecting a spacer (76B) having such a thickness that a value obtained by subtracting a sum of the first distance and the thickness in the axial direction of the spacer (76B) from the sum of the second distance and the third distance is in the predetermined range, among a plurality of different spacers (76B) having different thicknesses and placing the selected spacer (76B) at the predetermined position.

The manufacturing method of the second starting device according to the above aspect of the present disclosure measures the first distance in the axial direction between the leading end face of the friction member and the face of the lockup piston opposed to the spacer, the second distance in the axial direction between the shell-side abutting face of the pump shell and the face of the output member opposed to the spacer, and the third distance in the axial direction between the opposed face of the front cover and the cover-side abutting face of the front cover. The manufacturing method subsequently selects the spacer having such a thickness that the value obtained by subtracting the sum of the first distance and the thickness in the axial direction of the spacer from the sum of the second distance and the third distance is in the predetermined range larger than zero, among the plurality of different spacers having different thicknesses, and places the selected spacer at the predetermined position. This configuration enables the spacer having the more appropriate thickness to be placed at the predetermined position and thereby more effectively suppresses a variation in distance between the friction member and the opposed face of the front cover and a variation in stroke amount of the lockup piston. As a result, this further improves the response of the lockup.

The manufacturing method of the second starting device (1B) according to the above aspect of the present disclosure may locate the shell-side abutting face (40a) on a front cover (3)-side of the output member (7) in the axial direction.

In the manufacturing method of the second starting device (1B) according to the above aspect of the present disclosure, the output member (7) may include an outside extended portion (71) that is extended outward in a radial direction of the starting device (1) on an opposite side to the front cover (3) across the lockup piston (80), the outside extended portion (71) may include a recessed portion (72) that is recessed in the axial direction from a lockup piston (80)-side face (71a), the lockup piston (80) may include an axial direction extended portion (82) that is extended in the axial direction to enter the recessed portion (72), and the predetermined position may be between a bottom face (72a) of the recessed portion (72) and an end face (82a) of the axial direction extended portion (82) in the axial direction. In this case, the front cover (3) may include a side face (30) that includes the opposed face (30a) and that is extended in the radial direction and a tubular portion (31) that is extended in the axial direction from an outer circumference of the side face (30) and that includes the cover-side abutting face (31a). The first distance may be a distance in the axial direction between the leading end face (83a) of the friction member (83) and the end face (82a) of the axial direction extended portion (82). The second distance may be a distance in the axial direction between the shell-side abutting face (40a) and the bottom face (72a) of the recessed portion (72). The third distance may be a distance in the axial direction between the opposed face (30a) of the side face (30) and the cover-side abutting face (31a) of the tubular portion (31).

In the manufacturing method of the first or second starting device (1, 1B) according to the above aspect of the present disclosure, the damper (10) may be connected with the front cover (3) via the lockup clutch (8) and may be connected with the output member (7).

In the manufacturing method of the first or second starting device (1, 1B) according to the above aspect of the present disclosure, the process (b) may comprise integrating the front cover (3) with the pump shell (40) by laser welding. This configuration further reduces the variation in stroke amount of the lockup piston, compared with a configuration of integrating the front cover with the pump shell by an arc welded spot or the like.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is preferably applicable to the manufacturing industries of the starting device and so on.

The invention claimed is:

1. A starting device, comprising:
a front cover coupled with an engine and arranged such that a torque is transmitted from the engine;
a hydraulic power transmission comprising a pump impeller having a pump shell that is fixed to the front cover; a turbine runner placed to be opposed to the pump impeller and coupled with one of rotational elements; and a shell-side abutting face of the pump shell that abuts on a cover-side abutting face of the front cover in an axial direction of the starting device;
a damper configured to damp vibration between the front cover and an output member; and
a lockup clutch configured to enforce and release lockup that couples the front cover with the output member, wherein
the lockup clutch is a single plate-type clutch including a lockup piston that is supported by the output member to be movable in the axial direction; and a friction member fixed to a front cover-side face of the lockup piston,
the starting device further comprising:
a spacer placed at a predetermined position such that a distance between the friction member and an opposed face of the front cover which is opposed to the friction member is in a predetermined range larger than zero, wherein
the spacer has such a thickness in the axial direction that a value obtained by subtracting a sum of a first distance in the axial direction between a leading end face of the friction member and a face of the lockup piston opposed to the spacer, a second distance in the axial direction between the shell-side abutting face and a face of the output member opposed to the spacer, and the thickness in the axial direction of the spacer, from a third distance in the axial direction between the opposed face of the front cover and the cover-side abutting face, is within the predetermined range.

2. The starting device according to claim 1,
wherein the shell-side abutting face is located on a hydraulic power transmission side of the face of the output member opposed to the spacer in the axial direction.

3. The starting device according to claim 1,
wherein the output member includes an outside extended portion that is extended outward in a radial direction of the starting device on an opposite side to the front cover across the lockup piston, and
the predetermined position is between the lockup piston and the outside extended portion in the axial direction.

4. The starting device according to claim 3,
wherein the front cover includes a side face that includes the opposed face and that is extended in the radial direction; and a tubular portion that is extended in the axial direction from an outer circumference of the side face and that includes the cover-side abutting face,
the second distance is a distance in the axial direction between the shell-side abutting face and a face of the outside extended portion opposed to the spacer, and
the third distance is a distance in the axial direction between the opposed face of the side face and the cover-side abutting face of the tubular portion.

5. The starting device according to claim 1,
wherein the damper is connected with the front cover via the lockup clutch and is connected with the output member.

6. The starting device according to claim 1,
wherein the front cover and the pump shell are integrated with each other via a laser welded spot.

7. A starting device, comprising:
a front cover coupled with an engine and arranged such that a torque is transmitted from the engine;
a hydraulic power transmission comprising a pump impeller having a pump shell that is fixed to the front cover; a turbine runner placed to be opposed to the pump impeller and coupled with one of rotational elements; and a shell-side abutting face of the pump shell that abuts on a cover-side abutting face of the front cover in an axial direction of the starting device;
a damper configured to damp vibration between the front cover and an output member; and a lockup clutch configured to enforce and release lockup that couples the front cover with the output member, wherein the lockup clutch is a single plate-type clutch including a lockup piston that is supported by the output member to be movable in the axial direction; and a friction member fixed to a front cover-side face of the lockup piston, the starting device further comprising:

a spacer placed at a predetermined position such that a distance between the friction member and an opposed face of the front cover which is opposed to the friction member is in a predetermined range larger than zero, wherein the spacer has such a thickness in the axial direction that a value obtained by subtracting a sum of a first distance in the axial direction between a leading end face of the friction member and a face of the lockup piston opposed to the spacer and the thickness in the axial direction of the spacer, from a sum of a second distance in the axial direction between the shell-side abutting face and a face of the output member opposed to the spacer and a third distance in the axial direction between the opposed face of the front cover and the cover-side abutting face, is in the predetermined range.

8. The starting device according to claim 7, wherein the shell-side abutting face is located on a front cover side of the face of the output member opposed to the spacer in the axial direction.

9. The starting device according to claim 7, wherein the output member includes an outside extended portion that is extended outward in a radial direction of the starting device on an opposite side to the front cover across the lockup piston, the outside extended portion includes a recessed portion that is recessed in the axial direction from a lockup piston-side face, the lockup piston includes an axial direction extended portion that is extended in the axial direction to enter the recessed portion, and the predetermined position is between a bottom face of the recessed portion and an end face of the axial direction extended portion in the axial direction.

10. The starting device according to claim 9, wherein the front cover includes a side face that includes the opposed face and that is extended in the radial direction; and a tubular portion that is extended in the axial direction from an outer circumference of the side face and that includes the cover-side abutting face, the first distance is a distance in the axial direction between the leading end face of the friction member and the end face of the axial direction extended portion, the second distance is a distance in the axial direction between the shell-side abutting face and the bottom face of the recessed portion, and the third distance is a distance in the axial direction between the opposed face of the side face and the cover-side abutting face of the tubular portion.

11. The starting device according to claim 7, wherein the damper is connected with the front cover via the lockup clutch and is connected with the output member.

12. The starting device according to claim 7, wherein the front cover and the pump shell are integrated with each other via a laser welded spot.

13. A manufacturing method of a starting device, the starting device comprising a front cover coupled with an engine and arranged such that a torque is transmitted from the engine; a hydraulic power transmission comprising a pump impeller having a pump shell that is fixed to the front cover; a turbine runner placed to be opposed to the pump impeller and coupled with one of rotational elements; and a shell-side abutting face of the pump shell that abuts on a cover-side abutting face of the front cover in an axial direction of the starting device; a damper configured to damp vibration between the front cover and an output member; and a lockup clutch configured to enforce and release lockup that couples the front cover with the output member, wherein the lockup clutch is a single plate-type clutch including a lockup piston that is supported by the output member to be movable in the axial direction; and a friction member fixed to a front cover-side face of the lockup piston, the manufacturing method comprising:

(a) a process of placing a spacer at a predetermined position such that a distance between the friction member and an opposed face of the front cover which is opposed to the friction member is in a predetermined range larger than zero;

(b) a process of integrating the front cover with the pump shell; and (c) a process of measuring a first distance in the axial direction between a leading end face of the friction member and a face of the lockup piston opposed to the spacer, a second distance in the axial direction between the shell-side abutting face and a face of the output member opposed to the spacer, and a third distance in the axial direction between the opposed face of the front cover and the cover-side abutting face, prior to the process (a), wherein the process (a) comprises selecting a spacer having such a thickness that a value obtained by subtracting a sum of the first distance, the second distance and the thickness in the axial direction of the spacer from the third distance is in the predetermined range, among a plurality of different spacers having different thicknesses and placing the selected spacer at the predetermined position.

14. The manufacturing method of the starting device according to claim 13, wherein the shell-side abutting face is located on a hydraulic power transmission side of the face of the output member opposed to the spacer in the axial direction.

15. The manufacturing method of the starting device according to claim 13, wherein the output member includes an outside extended portion that is extended outward in a radial direction of the starting device on an opposite side to the front cover across the lockup piston, and the predetermined position is between the lockup piston and the outside extended portion in the axial direction.

16. The manufacturing method of the starting device according to claim 15, wherein the front cover includes a side face that includes the opposed face and that is extended in the radial direction; and a tubular portion that is extended in the axial direction from an outer circumference of the side face and that includes the cover-side abutting face, the second distance is a distance in the axial direction between the shell-side abutting face and a face of the outside extended portion opposed to the spacer, and the third distance is a distance in the axial direction between the opposed face of the side face and the cover-side abutting face of the tubular portion.

17. A manufacturing method of a starting device,
the starting device comprising a front cover coupled with an engine and arranged such that a torque is transmitted from the engine; a hydraulic power transmission comprising a pump impeller having a pump shell that is fixed to the front cover; a turbine runner placed to be opposed to the pump impeller and coupled with one of rotational elements; and a shell-side abutting face of the pump shell that abuts on a cover-side abutting face of the front cover in an axial direction of the starting device; a damper configured to damp vibration between the front cover and an output member; and a lockup clutch configured to enforce and release lockup that couples the front cover with the output member, wherein
the lockup clutch is a single plate-type clutch including a lockup piston that is supported by the output member to be movable in the axial direction; and a friction member fixed to a front cover-side face of the lockup piston,
the manufacturing method comprising:
(a) a process of placing a spacer at a predetermined position such that a distance between the friction member and an opposed face of the front cover which is opposed to the friction member is in a predetermined range larger than zero;
(b) a process of integrating the front cover with the pump shell; and
(c) a process of measuring a first distance in the axial direction between a leading end face of the friction member and a face of the lockup piston opposed to the spacer, a second distance in the axial direction between the shell-side abutting face and a face of the output member opposed to the spacer, and a third distance in the axial direction between the opposed face of the front cover and the cover-side abutting face, prior to the process (a), wherein
the process (a) comprises selecting a spacer having such a thickness that a value obtained by subtracting a sum of the first distance and the thickness in the axial direction of the spacer from the sum of the second distance and the third distance is in the predetermined range, among a plurality of different spacers having different thicknesses and placing the selected spacer at the predetermined position.

18. The manufacturing method of the starting device according to claim 17,
wherein the shell-side abutting face is located on a front cover side of the face of the output member opposed to the spacer in the axial direction.

19. The manufacturing method of the starting device according to claim 17,
wherein the output member includes an outside extended portion that is extended outward in a radial direction of the starting device on an opposite side to the front cover across the lockup piston,
the outside extended portion includes a recessed portion that is recessed in the axial direction from a lockup piston-side face,
the lockup piston includes an axial direction extended portion that is extended in the axial direction to enter the recessed portion, and
the predetermined position is between a bottom face of the recessed portion and an end face of the axial direction extended portion in the axial direction.

20. The manufacturing method of the starting device according to claim 19,
wherein the front cover includes a side face that includes the opposed face and that is extended in the radial direction; and a tubular portion that is extended in the axial direction from an outer circumference of the side face and that includes the cover-side abutting face,
the first distance is a distance in the axial direction between the leading end face of the friction member and the end face of the axial direction extended portion,
the second distance is a distance in the axial direction between the shell-side abutting face and the bottom face of the recessed portion, and
the third distance is a distance in the axial direction between the opposed face of the side face and the cover-side abutting face of the tubular portion.

* * * * *